United States Patent
Bauer et al.

(10) Patent No.: US 6,609,683 B2
(45) Date of Patent: Aug. 26, 2003

(54) SUPPORTING STRUCTURE FOR A SOLAR SAIL OF A SATELLITE

(75) Inventors: Markus Bauer, Munich (DE); Gerald Kuntze-Fechner, Waakirchen (DE)

(73) Assignee: Eurocopter Deutschland GmbH, Donawoerth (DE)

( * ) Notice: Subject to any disclaimer, the term of this patent is extended or adjusted under 35 U.S.C. 154(b) by 0 days.

(21) Appl. No.: 10/053,615

(22) Filed: Jan. 24, 2002

(65) Prior Publication Data

US 2002/0096603 A1 Jul. 25, 2002

(30) Foreign Application Priority Data

Jan. 24, 2001 (DE) .......................... 101 03 074

(51) Int. Cl.[7] ............................... B64G 1/44
(52) U.S. Cl. ................ 244/158 R; 244/173; 244/168
(58) Field of Search ............. 244/173, 158 R, 244/168

(56) References Cited

U.S. PATENT DOCUMENTS

| | | | |
|---|---|---|---|
| 3,339,863 A | | 9/1967 | Webb .......................... 244/1 |
| 4,148,163 A | * | 4/1979 | Chenin et al. ................ 52/71 |
| 4,262,867 A | | 4/1981 | Piening ...................... 244/168 |
| 4,293,731 A | * | 10/1981 | Schweig et al. ............. 136/245 |
| 5,131,341 A | * | 7/1992 | Newman .................. 114/39.21 |
| 5,520,747 A | * | 5/1996 | Marks ......................... 136/245 |
| 5,775,645 A | * | 7/1998 | Yocum et al. ............... 244/168 |
| 5,785,280 A | * | 7/1998 | Baghdasarian .............. 244/173 |
| 6,010,096 A | * | 1/2000 | Baghdasarian .............. 244/173 |
| 6,102,336 A | * | 8/2000 | Cande ........................ 244/168 |
| 6,188,012 B1 | * | 2/2001 | Ralph ......................... 136/246 |

FOREIGN PATENT DOCUMENTS

JP      4-143198      5/1992

* cited by examiner

*Primary Examiner*—Charles T. Jordan
*Assistant Examiner*—Stephen A Holzen
(74) *Attorney, Agent, or Firm*—Crowell & Moring LLP

(57) ABSTRACT

A supporting structure for a solar sail of a satellite is formed by support arms which are connected in a swiveling manner with a solar panel through unfolding joints, and a film is stretched between the support arms. A longitudinal connector is arranged parallel to one side edge of the solar panel, which has support arms that are arranged in a joint direction in the plane of the film and form at least one U-shaped supporting structure between which the film of the solar sail can be stretched. Corner connectors are arranged in the interior angle areas between the longitudinal connector and the support arms. This arrangement simplifies known constructions while maintaining the existing functional safety in order to allow for achieving a noticeable weight reduction.

14 Claims, 3 Drawing Sheets

SUPPORTING STRUCTURE FOR A SOLAR SAIL OF A SATELLITE

BACKGROUND AND SUMMARY OF THE INVENTION

This application claims the priority of 101 03 074.6, filed Jan. 24, 2001, the disclosure of which is expressly incorporated by reference herein.

The invention relates to a supporting structure for a solar sail of a satellite consisting of support arms which are connected with a solar panel in a swiveling manner by way of unfolding joints and where a film is stretched between the support arms.

Solar generators on board satellites serve the energy supply of the existing satellite systems. A solar generator comprises several individual solar plates, so-called solar panels, which have a rigid supporting structure, and each supporting structure carries solar cells. This supporting structure is a lightweight construction and takes on a sandwich structure. It can be, for example, an aluminum honeycomb core with cover and base surfaces made of carbon fiber (CFK) laminate. These solar panels are connected with each other by way of hinge joints with the ability to rotate. With the help of endless cable control connections, the individual actuators, which are connected with the hinge joints, can swivel the solar panels relative to each other.

During transportation from Earth into the orbit of the satellite, the solar panels are folded. They are not unfolded until they have reached space. The unfolding process of the solar panels occurs smoothly, and the solar panels lock into an unfolded locking position nearly simultaneously.

In the unfolded state, all the solar panels are basically arranged in one plane. The solar generator is connected with the structure of the satellite by way of a yoke device. Such an arrangement of a solar generator with a yoke device is called a generator wing. Generally, a satellite has yet another, diametrically arranged generator wing.

Upon unfolding the solar panels into a generator wing, a so-called solar sail is also unfolded. The solar sail is a thin, elastic film, which serves the purpose of controlling the position of the generator wing. The solar sail works on the basis of a direct conversion of photon radiation from the sun into kinetic energy, which is used to control the position for the solar wing.

Starting from the yoke device, the solar panels are arranged one behind another in radial distance from the yoke device. The solar sail is installed on the second to last solar panel, which is arranged in radial direction starting from the yoke device. This solar panel, which holds the solar sail, is hereinafter referred to as the "second to the last solar panel".

The second to the last solar panel has an unfolding mechanism for the solar sail. The unfolding mechanism comprises unfolding joints and locking devices. The unfolding of the solar sail using the unfolding mechanism must be considered in connection with the unfolding of the solar panels. Unfolding of the solar panels of a generator wing begins with the solar panel that is located the farthest away from the yoke device, the so-called outer, i.e. last, solar panel. This outer solar panel contains an endless cable control along its two opposite side edges via deflection rollers with a prestressed spring. With the pyrotechnic severing of the hold-down plates from a hold-down device, the kinetic energy of the prestressed springs is released and the outer panel is swiveled from the hold-down position by 90° vis-à-vis the second to the last panel via the deflection rollers of the cable controls. This unfolding process of the outer panel serves a so-called emergency unfolding. This supplies the satellite systems with a first additional emergency power supply, which can also be used for the continued unfolding process. The additional solar panels, which follow in the direction of the yoke device, contain cable control guides that are laterally offset in relation to each other. This allows for synchronized movement during the unfolding process until the locking in the unfolding position.

The solar sail is arranged in a folded position on the second to the last solar panel by way of its own unfolding mechanism. The unfolding mechanism contains several, e.g., as is known in the art, 5 unfolding joints between a side edge of the supporting, second to the last solar panel and ribs (support arms) of the solar sail. With their individual swiveling axes, the unfolding joints form a fictitious or imaginary, common swiveling axis.

Normally, the solar sail has a square or rectangular surface. Each unfolding joint has a prestressed spring, which applies force on the joint and which is taut in the folded position of the solar sail and contains stored kinetic energy.

In the folded position, the solar sail swings around the unfolding joints into a parallel position to the second to the last solar panel. Using a locking device, which is arranged between the third to the last and the second to the last solar panels, the solar sail is maintained in its folded position.

In known state of the art, the solar sail contains ribs (so-called support arms) for reinforcement purposes; these ribs are guided transversely in relation to the swiveling axis and are arranged longitudinally, at a distance, in relation to the swiveling axis of the solar sail. One end each of the ribs is connected with one of the unfolding joints, and the other end of the rib is locked in the folded position using the locking device. Several unfolding joints and several locking devices are required for this, depending on the size of the solar panel. The locking device consists of a tension hook on the second to the last solar panel and a locking wedge on the third to the last solar panel. In the folded state, the locking wedge and tension hook are engaged with each other. This design has the disadvantage that it leads to an increase in the overall weight of the generator wing. The fact that several ribs are installed also increases the weight.

The unfolding process shows, furthermore, that the aperture angle between the second to the last solar panel with the solar sail and the third to the last solar panel keeps increasing so that the locking wedges, which are arranged on the third to the last solar panel, release the tension hooks with a continually increasing aperture angle, thus releasing individual ribs. These released ribs swivel, due to the prestressed spring, in the unfolding joint so that with the release of the last rib the entire solar sail swings into an unfolded position. The angle of incidence in the unfolded position of the solar sail vis-à-vis the solar panel is for example 90 to 110°. In this unfolded position, power in the direction of all three space axes of the generator wing can be converted due to the sun's photon radiation. This also occurs with the generator wing that is arranged on the opposite side of the satellite. Thus, the solar sail serves to stabilize the position of the generator wing in space and its alignment.

We also know of another realization of the solar sail, which uses a rigid circumferential frame (4 frame parts), stretching around the solar sail and which is arranged on the second to the last solar panel, also with an unfolding mechanism.

An object of the invention is to simplify the constructions that are known in the art, while maintaining the existing functional safety, in order to achieve a considerable weight reduction.

This object is achieved in accordance with preferred embodiments of the invention by providing supporting structure for a solar sail of a satellite, formed by support arms which are connected with a solar panel through unfolding joints in a swiveling manner with a solar sail film stretched between the support arms, wherein a longitudinal connector which is arranged parallel to one side edge of the solar panel contains support arms which are located in a joint direction in the plane of the film forming at least one U-shaped supporting structure between which the film of the solar sail can be stretched, and wherein corner connectors are arranged in respective interior angle areas between the longitudinal connector and a respective support arm.

The invention proposes to use a U-shaped supporting structure for the solar sail. This U-shaped supporting structure contains on its base edge a longitudinal connector, on which support arms are arranged in one plane. The support arms are guided transversely to the longitudinal connector, pointing in one direction. The support arms and the longitudinal connector form the U-shaped supporting structure. The longitudinal connector is arranged parallel to a side edge of the second to the last solar panel. The longitudinal dimensions of both support arms and of the longitudinal connector influence the surface size of the solar sail.

In the interior angle area between the longitudinal connector and support arm, a buckle-proof profile with connecting points without torsional buckling is arranged on the longitudinal connector and support arm. Advantageously, this profile is designed in one piece and it is referred to as a corner connector. The corner connector can be mounted from two semi-shells, which can be inserted into each other in a positive-locking manner.

Alternatively, this support of the profile in the interior angle area can also be designed as two pieces by arranging a buckle-proof profile and a connection without torsional buckling between the longitudinal connector and the support arm. In the realization it is possible to join several U-shaped supporting structures into one common supporting structure.

Preferred embodiments of the invention have the advantage that they include only three components, i.e. two support arms and one longitudinal connector, for stretching the solar sail. Thus, the number of components as compared to the known state of the art can be reduced, which is reflected in a weight reduction. This arrangement into a U-shaped supporting structure for the solar sail is possible because with this arrangement the bending forces from the support arm can be introduced into the longitudinal connector in a torsion-rigid manner, and also the tension forces of the film can be introduced into the longitudinal connector over the support arms in a bending-rigid manner.

An advantageous realization shows a so-called rigid corner connector. This rigid corner connector is formed by placing two semi-shells on top of each other in the interior angle area of the intersecting area between the longitudinal connector and support arm, with these semi-shells enclosing the longitudinal connector and the support arm. The interior angle is thus completely enclosed by the two semi-shells.

Furthermore, the invention allows for the use of the lightest-weight film that is possible. This also contributes to the weight reduction. The invention also makes a fast production of the supporting structure possible. Only simple components need to be manufactured. There are fewer unfolding joints and fewer locking devices. The result is a noticeable weight reduction.

Other objects, advantages and novel features of the present invention will become apparent from the following detailed description of the invention when considered in conjunction with the accompanying drawings.

BRIEF DESCRIPTION OF THE DRAWINGS

FIG. 2a is a view showing supporting structure formed by two U-shaped supporting structures constructed according to another preferred embodiment of the invention;

DETAILED DESCRIPTION OF THE PREFERRED EMBODIMENT

The figures are not shown true to dimension in order to better schematically depict the preferred embodiments of the invention.

Figure 1:
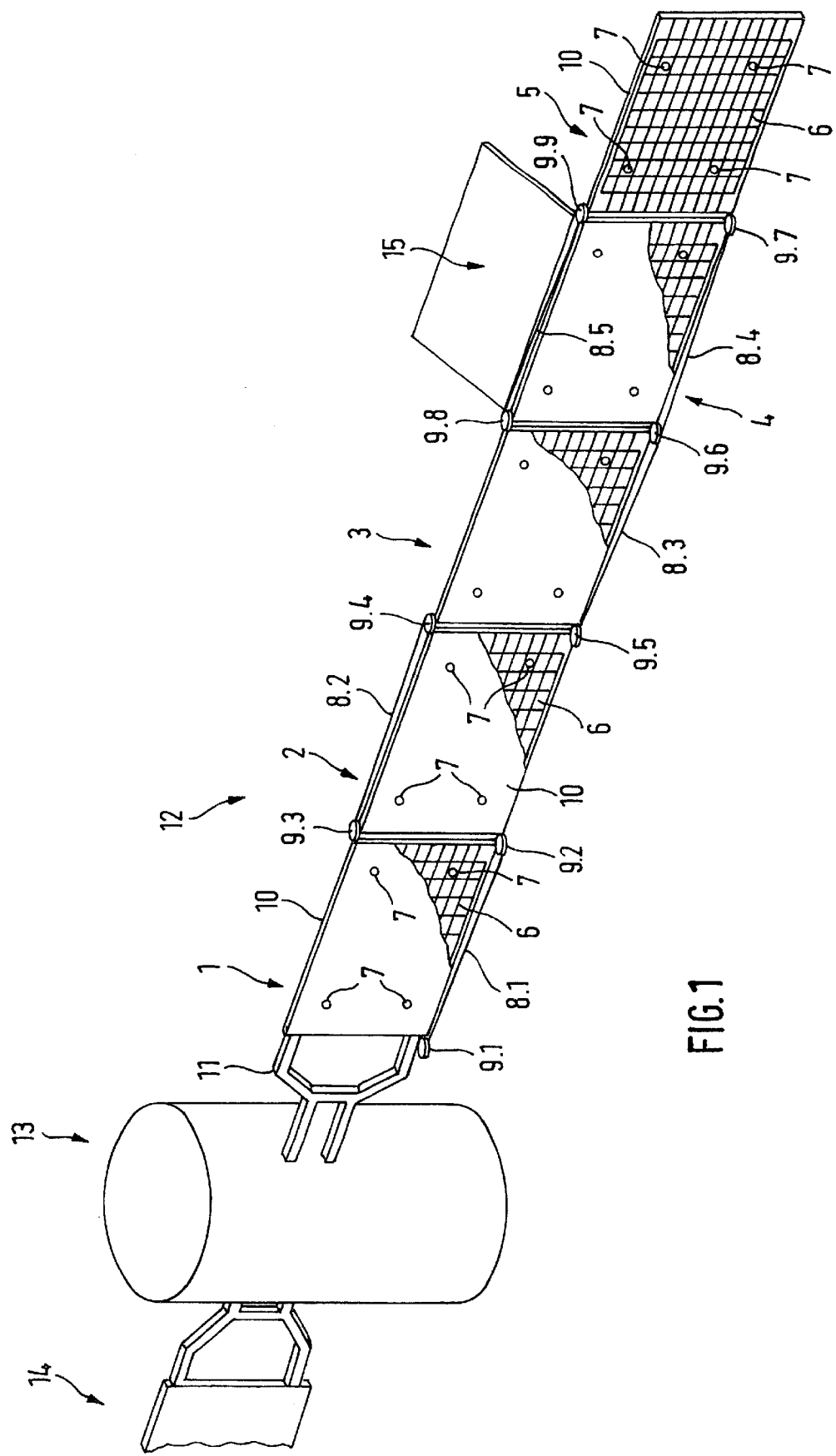
FIG. 1 is a schematic perspective partial view of a satellite with solar generator, constructed according to a preferred embodiment of the present invention.

FIG. 1 shows a satellite 13 with a solar generator. The solar generator is formed by a generator wing 12 and the diametrically arranged (not completely shown) generator wing 14. The explanations below regarding the generator wing 12 also apply for the generator wing 14.

The generator wing 12 comprises a yoke device 11, which, on the one hand, is connected with the structure of the satellite 13 and, on the other hand, carries several solar plates. An individual solar plate is also called a solar panel. In the unfolded state, the solar panels are arranged in series adjacent to one another. FIG. 1 shows the unfolded state of the generator wing 12. The generator wing 12 has five solar panels. A first solar panel 1 is fastened to the yoke device 11. A second solar panel 2, a third to the last solar panel 3, a second to the last solar panel 4 and an outer solar panel 5 follow. The individual solar panels are connected by way of hinge joints. The hinge joints are coupled with deflection rollers, and along a side edge an endless cable control is guided via the deflection rollers. On the first solar panel, a cable control 8.1 is guided on the deflection rollers with hinge joints 9.1 and 9.2. Alternating to the other side edge of the second solar panel 2, the cable control 8.2 is guided there between the deflection rollers by way of hinge joints 9.3 and 9.4. Again alternating to the other side edge of the third to the last solar panel 3, a cable control 8.3 is guided via the deflection rollers by way of hinge joints 9.5 and 9.6. The second to the last solar panel 4 has one cable control 8.4 each with deflection rollers and hinge joints 9.6 and 9.7 on both side edges as well as cable control 8.5 with deflection rollers and hinge joints 9.8 and 9.9.

Furthermore, FIG. 1 shows that each individual solar panel consists of a rigid supporting structure 10, which is coated with solar cells 6. Each solar panel also contains bore holes, so-called hold-down points 7; however in the unfolded state these hold down points are not important.

The second to the last solar panel 4 has an unfolded solar sail 15 on a side edge. The solar sail 15 is always arranged on the second to the last solar panel 14 according to the illustrated preferred embodiments. Such a solar sail can also be found on the generator wing 14.

Figure 2:
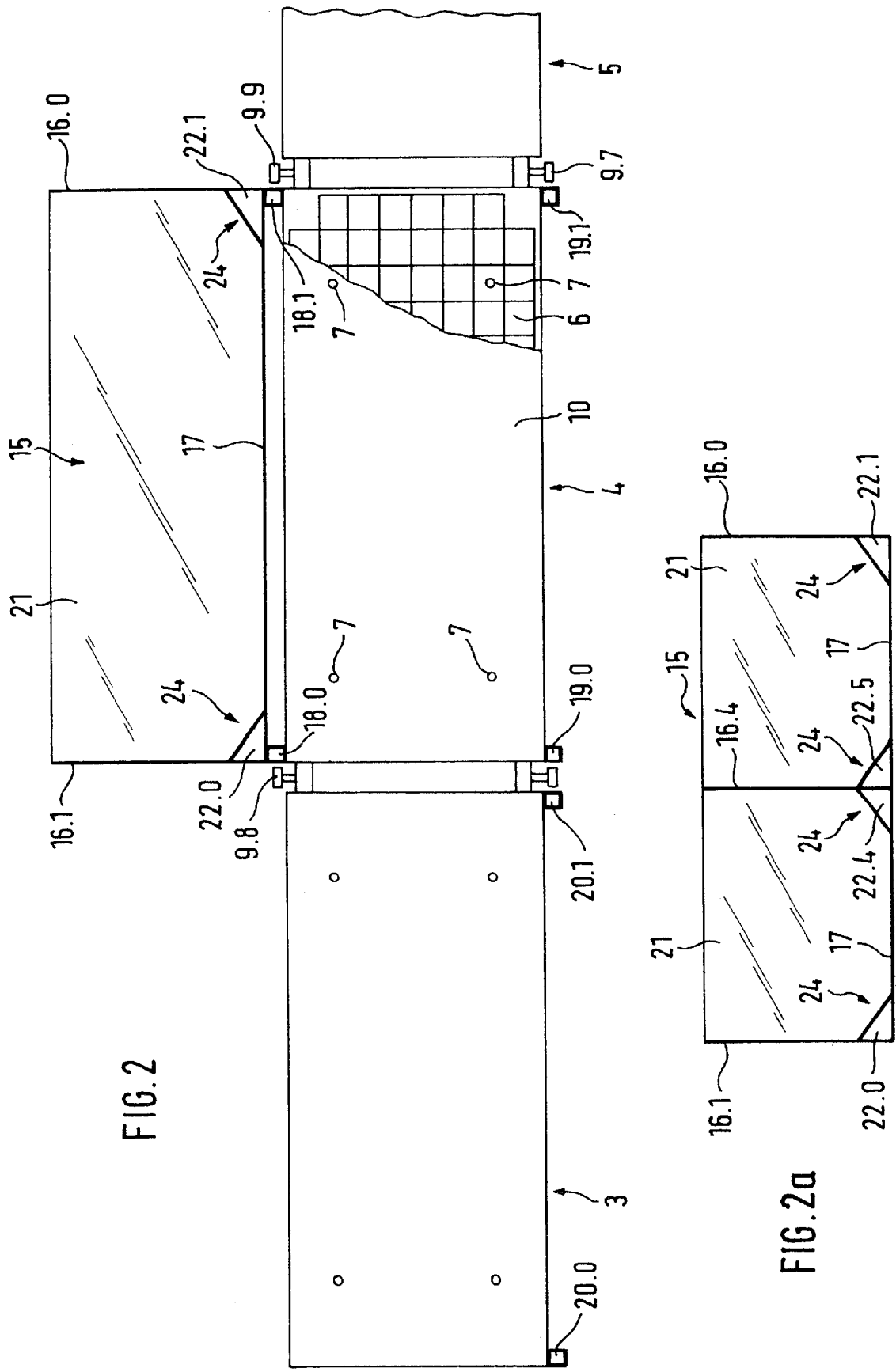
FIG. 2 is an enlarged view of a section of a generator wing with solar sail of the satellite of FIG. 1.

FIG. 2 depicts a section from the generator wing 12 with the solar sail 15. The solar sail 15 is stretched in a supporting structure, which is formed by one longitudinal connector 17 and two support arms 16.0, 16.1. In one direction, the two support arms 16.0, 16.1 are arranged perpendicular in relation to the ends of the longitudinal connector 17, and they are located in a joint plane. The supporting structure thus takes on a U-shaped design. A film 21 is tightened between the two support arms 16.0, 16.1 and the longitudinal connector 17. Film 21 is fastened to the supporting structure. The supporting structure and the film 21 form the solar sail 15. One unfolding joint 18.0, 18.1, respectively, is arranged on the intersecting points between the longitudinal connector 17 and the support arms 16.0, 16.1. These unfolding joints are connected with the supporting structure of the second to the last solar panel 4 in the area of a side edge. FIG. 2 shows the unfolded state of the solar sail.

In the folded state, the solar sail 15 is swiveled with respect to the second to the last solar panel 4, i.e. the film 21 is arranged adjacent and parallel in relation to the surface of the solar cells 5. Meanwhile, one support arm 16.0, 16.1, respectively, is locked by one locking device, respectively, for as long as, in the folded state of the generator wing 12, one locking wedge 20.0, 20.1 of the third to the last solar panel 3, respectively, holds the tension hooks 19.0, 19.1 in its locking position. It is only when the generator wing 12 is unfolded that the third to the last solar panel 3 and the second to the last panel 4 are also unfolded so that the locking wedges 20.0, 20.1 release the tension hooks 19.0, 19.1 and that they release the support arms 16.0, 16.1 of the solar sail. The solar sail 15 can then swivel into its end position due to the elastic force of the unfolding joints 18.0, 18.1. During the unfolding of the solar sail 15, torsion forces and bending forces are transmitted by the support arms 16.0, 16.1 to the longitudinal connector 17. In order to achieve the required rigidity and firmness between the support arm 16.0, 16.1 and the longitudinal connector 17, the corner connectors 22.0 and 22.1 are arranged in the area of the interior angles 24 at that location. These corner connectors correspond to a buckle-proof profile with connecting points without torsional buckling on the longitudinal connector 17 and support arm 16.0 or 16.1.

FIG. 2a shows that with a larger surface expansion of the solar sail, for example, two U-shaped supporting structures can also be arranged adjacent to each other. The number of U-shaped supporting structures to be arranged is dependent on the dimensions of the solar sail. It is possible to arrange additional U-shaped supporting structures next to one another. According to FIG. 2a, both U-shaped supporting structures have one joint longitudinal connector 17.

According to FIG. 2a the support arm 16.4 is also a joint support arm, which is connected with the longitudinal connector 17 in the perpendicular position. The support arm 16.4, however, is connected with the longitudinal connector 17 on both sides through the corner connectors 22.4, 22.5, which are arranged in the plane of the film 21.

Figure 3:
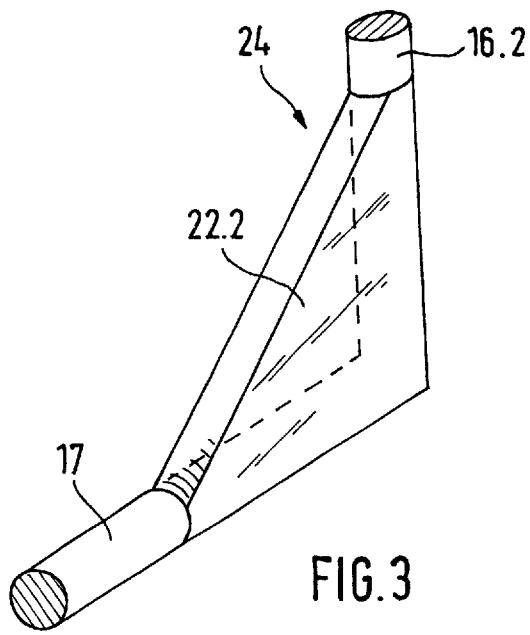
FIG. 3 is a view of a corner connector in an interior angle area between a longitudinal connector and support arm of the supporting structure of FIGS. 1 and 2.

FIG. 3 shows an advantageous corner connector 22.2. This rigid corner connector 22.2 is formed by two semi-shells. Both semi-shells enclose the longitudinal connector 17 and the corresponding support arm 16.2 on half the side. Both semi-shells come into contact with each other at their seams and form a hollow space in the interior angle area.

Figure 3A:
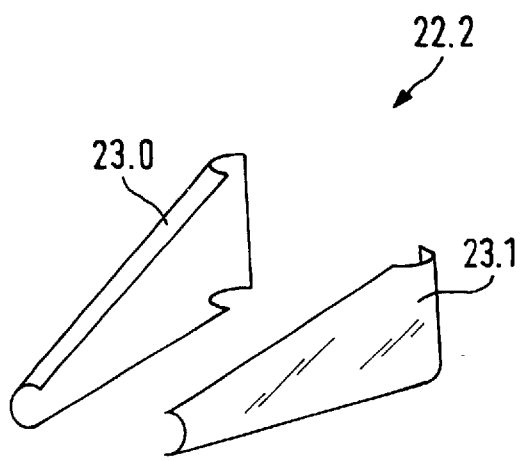
FIG. 3a is a view showing semi-shells visable as corner connectors of FIG. 3.

FIG. 3a shows a corner connector 22.2 consisting of two semi-shells 23.0 and 23.1. These semi-shells 23.0 and 23.1 can be connected with each other in such a way, e.g. by way of gluing, that a section of the longitudinal connector as well as a section of the support arm are enclosed. In the assembled state, the corner connector 22.2 is one piece.

The supporting structure with corner connectors according to the invention meets the rigidity and firmness requirements and additionally offers a noticeable weight reduction.

Figure 3B:
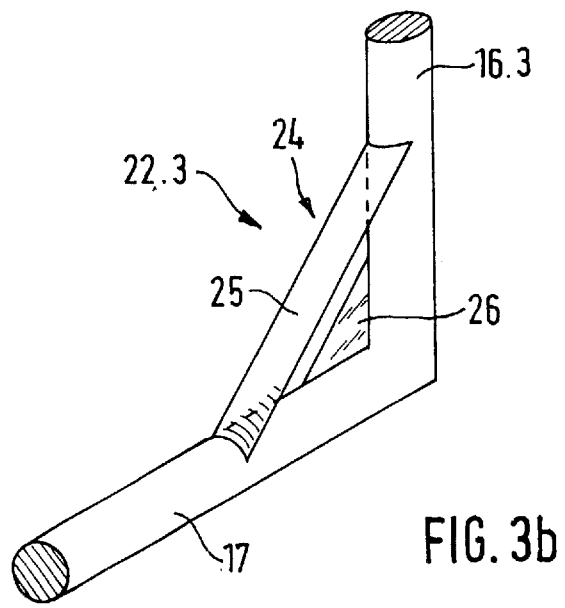
FIG. 3b is a view similar to FIG. 3, showing two-piece corner connector.

In accordance with another embodiment as seen in FIG. 3b, the corner connector 22.3 can also take on a two-piece design. This is possible, on the one hand, if a buckle-proof profile 25, extending across the interior angle 24, connects a support arm 16.3 with the longitudinal connector 17 and, on the other hand, if a connection without torsional buckling 26 is arranged in the intersecting area between the support arm 16.3 and longitudinal connector 17. Such an alternative can contribute to further reducing the weight.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Supporting structure for a solar sail of a satellite, formed by support arms which are connected with a solar panel through unfolding joints in a swiveling manner with a solar sail film stretched between the support arms, wherein a longitudinal connector, which is arranged parallel to one side edge of the solar panel contains the support arms, which are located in a joint direction in the plane of the film forming at least one U-shaped supporting structure, between which the film of the solar sail can be stretched, and wherein corner connectors are arranged in each of the respective interior angle areas between the longitudinal connector and the respective support arm.

2. Supporting structure as claimed in claim 1, wherein each of the corner connectors have a buckle-proof profile with connecting points without torsional buckling on the longitudinal connector and on one support arm.

3. Supporting structure as claimed in claim 2, wherein the corner connectors are each designed in one piece.

4. Supporting structure as claimed in claim 3, wherein the corner connectors are each formed by two semi-shells that form a positive lock in relation to each other.

5. Supporting structure as claimed in claim 1, wherein each corner connector is designed in two pieces.

6. Supporting structure as claimed in claim 5, wherein a buckle-proof profile with connecting points is arranged between the longitudinal connector and a support arm, and wherein a connecting point without torsional buckling is arranged between the longitudinal connector and the support arm.

7. Supporting structure as claimed in claim 1, wherein the supporting structure is formed by two adjacent U-shaped supporting structures; and wherein a longitudinal connector and three support arms are arranged for this purpose.

8. A satellite assembly comprising:

a solar panel;

a longitudinal connector extending along an edge of said solar panel, a solar sail;

a pair of solar sail support arms extending laterally of said connector, a pair of corner connectors rigidly connecting the longitudinal connector with respective area of said support arm to form a U-shaped solar sail supporting structure with said solar sail stretched between the support arms;

wherein said longitudinal connector is supported for pivotal movement at the edge of the solar panel to accommodate pivoting movement of the sail and U-shaped solar sail supporting structure between a storage position with the sail disposed folded on top of the solar panel and in use unfolded position with the sail disposed laterally of the solar panel.

9. A satellite assembly according to claim 8, wherein each of the corner connectors have a buckle-proof profile with connecting points without torsional buckling on the longitudinal connector and on one support arm.

10. A satellite assembly according to claim 8, wherein each corner connector is formed of two shell parts clamping engaging the longitudinal connector and one of the support arm.

11. A satellite assembly according to claim 8, wherein each corner connector includes a buckling resistor profile member extending diagonally fixedly at one side to the longitudinal connector at another side to one of the support arms.

12. A satellite assembly according to claim 8, wherein a pair of said U-shaped solar sail supporting structures are provided which have a common supporting arm.

13. A satellite assembly according to claim 8, wherein a plurality of solar panels are provided which are foldable with respect to one another and include solar panels without a solar sail connected therewith in addition to said solar panel with said solar sail and supporting structure.

14. A satellite assembly according to claim 13, wherein said solar panels are disposed on a plurality of solar panel assembly wings which in use extend laterally of a satellite body in different directions, and wherein each wing includes a solar panel with one of said solar sails and supporting structures.

* * * * *